Figure 5:
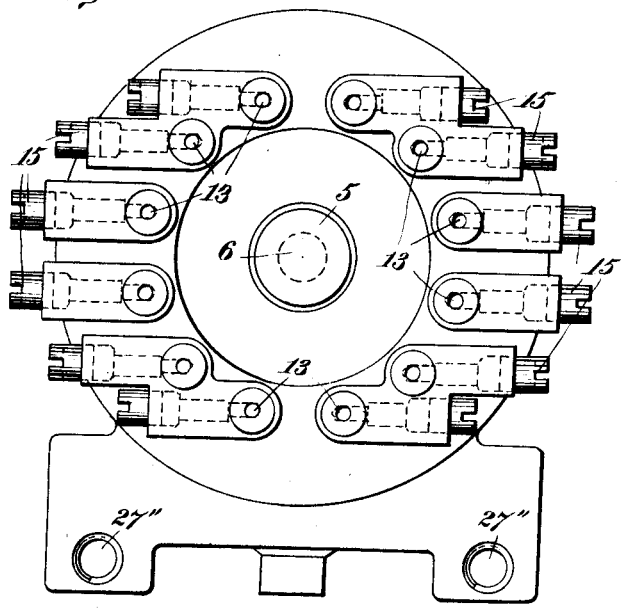

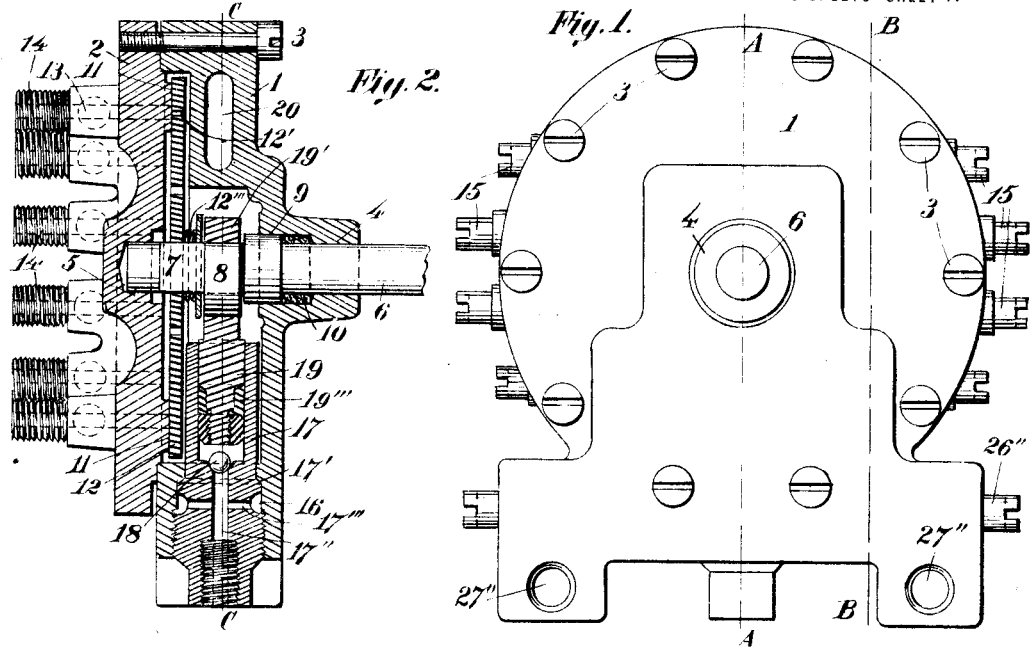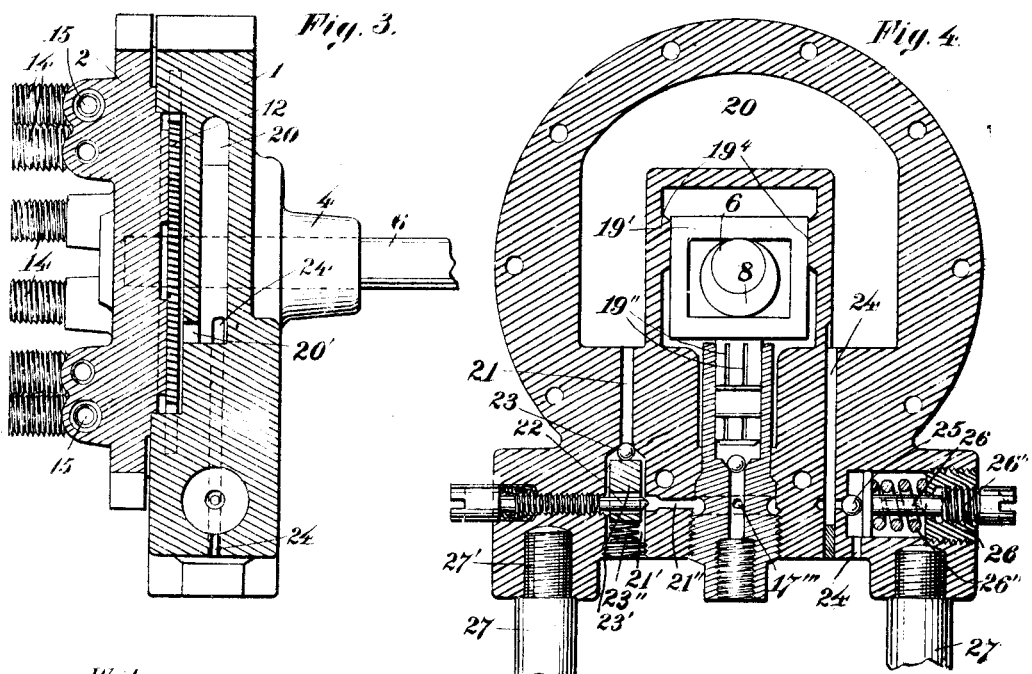

C. G. HAWLEY.
FORCE FEED LUBRICATOR.
APPLICATION FILED DEC. 8, 1906.

1,184,346.

Patented May 23, 1916.
6 SHEETS—SHEET 2.

Witnesses
A. W. Nelson
John R. Lefevre

Inventor
Charles Gilbert Hawley

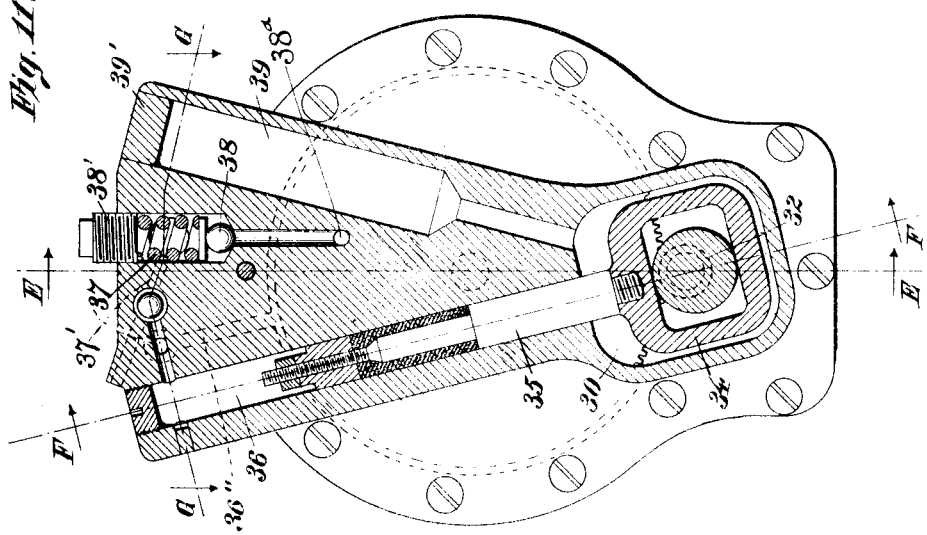
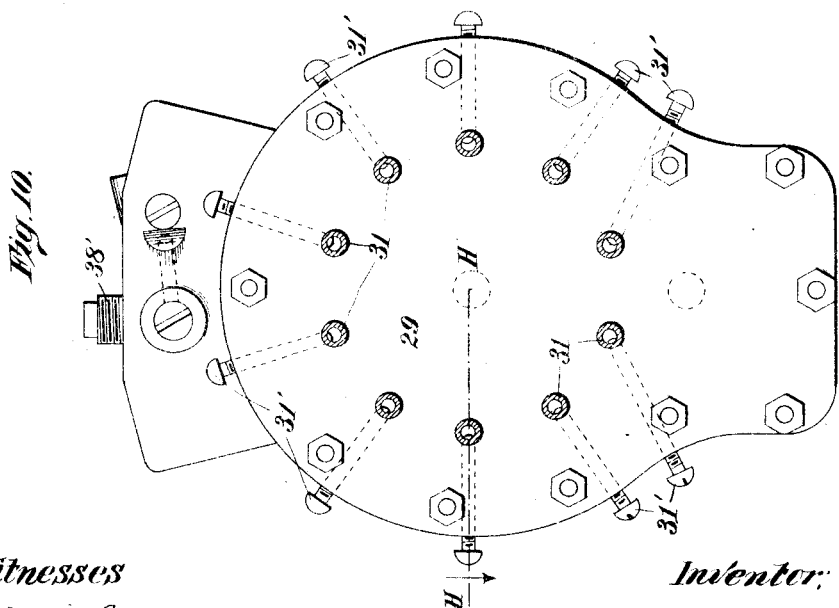

C. G. HAWLEY.
FORCE FEED LUBRICATOR.
APPLICATION FILED DEC. 8, 1906.
1,184,346.
Patented May 23, 1916.
6 SHEETS—SHEET 4.
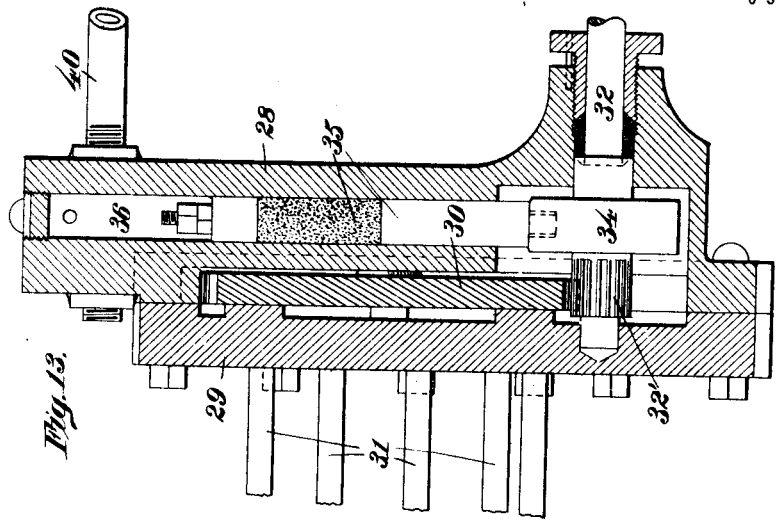
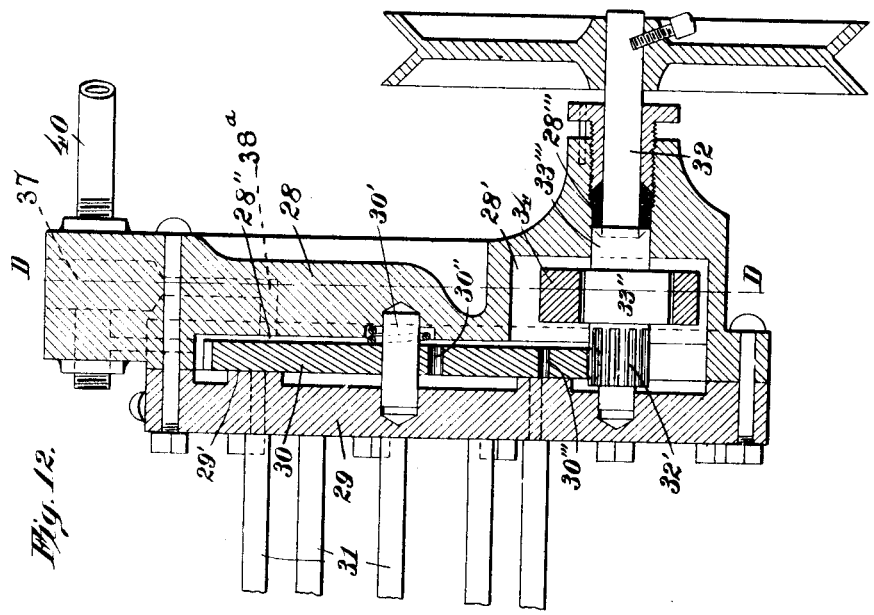
Witnesses.
M. Simon
G. H. Nelson
Inventor
Charles Gilbert Hawley C. G. HAWLEY.
FORCE FEED LUBRICATOR.
APPLICATION FILED DEC. 8, 1906.
1,184,346.
Patented May 23, 1916.
6 SHEETS—SHEET 5.
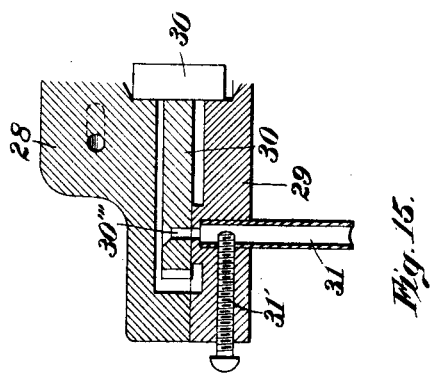
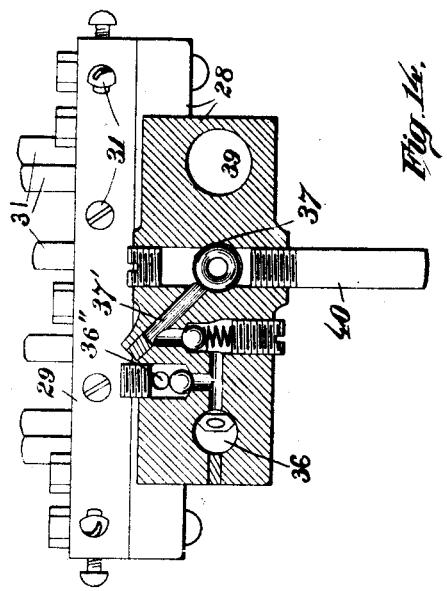
Witnesses:
M. Simon
A. W. Nelson
Inventor
Charles Gilbert Hawley

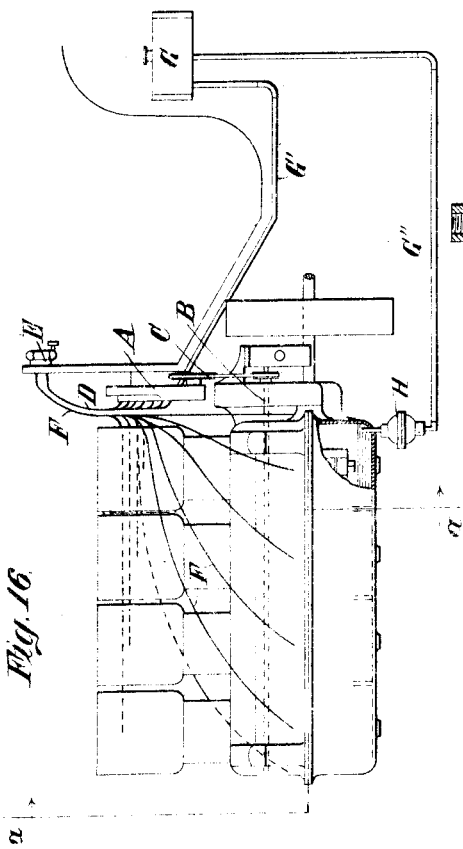

UNITED STATES PATENT OFFICE.

CHARLES GILBERT HAWLEY, OF CHICAGO, ILLINOIS.

FORCE-FEED LUBRICATOR.

1,184,346.  Specification of Letters Patent.  Patented May 23, 1916.

Application filed December 8, 1906. Serial No. 346,896.

*To all whom it may concern:*

Be it known that I, CHARLES GILBERT HAWLEY, a citizen of the United States, and a resident of Chicago, Cook county, Illinois, have invented a certain new, useful, and Improved Force-Feed Lubricator, of which the following is a full, clear, and exact description, such as will enable others skilled in the art to which it appertains to make and use the same.

My invention relates to means for lubricating machinery, engines, and the like, and my invention has special reference to improvements in lubricators of that class known as force feed lubricators.

The object of my invention is to provide a lubricating device, or oiler, which shall be adapted to supply oil under pressure to numerous bearings or points of use.

The special objects of my invention will appear hereinafter.

My invention consists generally in a mechanical, or force feed lubricator, having a plurality of outlets, with means for regulating or adjusting the size of each of said outlets, independent of the others.

Further, my invention consists of a device of the class mentioned, wherein a small body of air is compressed, and furnishes the force for ejecting the oil through said outlets, and further, my invention consists of a device of the class described, containing an oil chamber wherefrom outlets lead, in combination with means for charging the same with oil under pressure, and said chamber being provided with an opening, or by-pass, through which oil is discharged with a velocity proportional to the pressures at which the oil is maintained within the chamber, and further, my invention consists in a device of the class mentioned, comprising a chambered casing, or body, having a plurality of outlet openings, in combination with means for adjusting or regulating the size of said openings, means for maintaining constant pressure within said chamber, for the purposes hereinafter described and further, my invention consists in a chambered body, or casing, provided with suitable outlets, in combination with a pump for delivering the oil to said casing, a distributer controlling said outlets, means for driving said distributer and pump, and a by-pass connecting the interior of the casing with the intake end of said pump, and my invention also consists in a chambered body, or casing, provided with a plurality of valved outlets, and provided with an air dome, or chamber, in combination with a pump for delivering oil to said casing, and suitable pressure regulating means responsive to variations of pressure within said casing.

My invention also consists in various novel constructions and combinations of parts, all as hereinafter described and particularly pointed out in the claims.

The invention will be more readily understood by reference to the accompanying drawings, forming a part of this specification, and in which—

Figure 7:
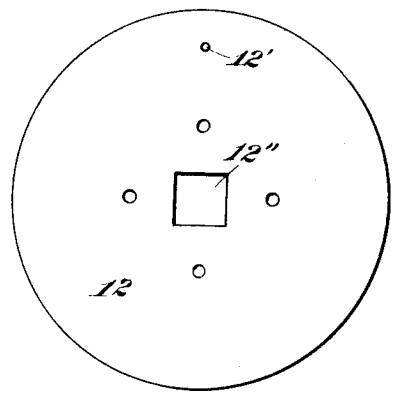
Figure 6:
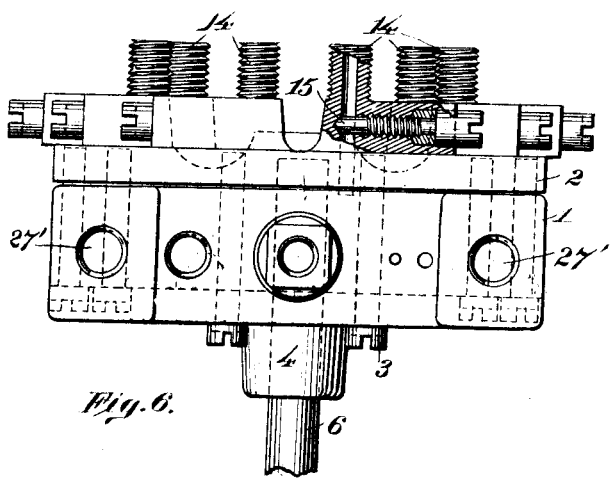
Figure 8:
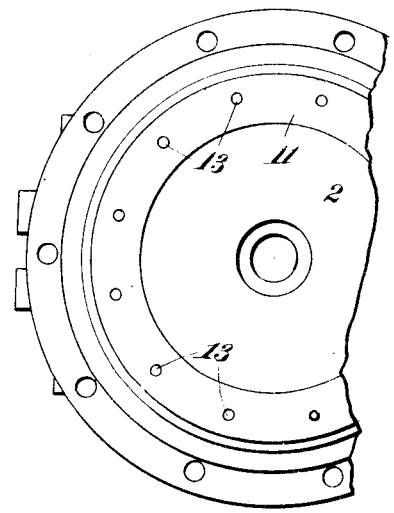
Figure 9:
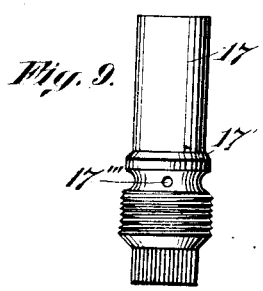

Figure 1, is an elevation of a force feed lubricator embodying my invention. Fig. 2, is a sectional view thereof, on the line A, A of Fig. 1. Fig. 3, is a sectional view on the line B, B, of Fig. 1. Fig. 4, is a transverse sectional view on the line C, C, of Fig. 2. Fig. 5, is an elevation of the opposite side of the lubricator. Fig. 6, is a plan view of the device from beneath, a portion of one of the outlet connections being shown in section. Fig. 7, is a view of the distributer, or disk. Fig. 8, is an inner side view of the outlet side of the casing. Fig. 9, is a detail view of the pump cylinder. Fig. 10, is a rear side elevation of my device in modified form. Fig. 11, is a vertical section on the line D, D, of Fig. 12. Fig. 12, is a sectional view on the line E, E, of Fig. 11. Fig. 13, is a sectional view on the line F, F, of Fig. 11. Fig. 14, is a horizontal section on the irregular line G, G, of Fig. 11. Fig. 15, is a partial sectional view on the line H, H, of Fig. 10. Fig. 16, is a side elevation of an engine, showing the lubricator of Figs. 10 to 15 attached thereto. Fig. 17, is an end view taken from Fig. 16. Fig. 18, is a sectional detail of the strainer.

Referring to Figs. 1 to 9, of the drawings, it will be seen that a preferred form of my lubricating device, comprises two substantially circular halves, 1 and 2, fastened together by a number of bolts, or screws, 3. The joint between the halves is made to be tight. The parts 1 and 2 contain central bearings 4 and 5, for a shaft, 6. One portion, 7, of this shaft is square, another portion, 8, forms an eccentric, and still another portion, 9, forms a part of a stuffing box, whereof, 10, is the cavity which contains packing. Pressure within the casing tends to project the shaft, and thus drives it against the packing, thereby closing the joint between the shaft and the bearing, 4. The part, 2, is provided with a concentric annular surface, 11. The outlet holes, 13, are bored through the surface 11, and being continued through the nipples 14, are controlled or regulated by the pin valves 15. The disk 12 is provided with a single hole, 12', at the same distance from the center as the holes 13. Obviously, rotation of the disk causes the hole 12' to register with the holes 13, successively. The disk is provided with a square hole, 12'', fitting the square portion, 7, of the shaft, through the medium of which the disk is rotated. A simple spring 12''' (Fig. 2), presses the disk against the annular seat 11, to hold it in place when there is no pressure of oil within the casing. The member, 1, of the casing, contains a hole, 16, in its bottom. In this I place the cylinder, 17, of the pump. This cylinder resembles a plug which is screwed into the opening, and is provided with a shoulder, 17', whereby a tight fit is insured. The upper end of the inlet duct 17'' is closed by a ball valve, 18, or like gravity valve. The lower end of the pump is squared to receive a wrench. The short cylinder 17 is occupied by a plunger, 19, of the pump. The upper end of this plunger is formed by the yoke, 19', which fits the eccentric 8, whereby the plunger is reciprocated when the shaft is rotated. If desired, the plunger may be fitted tightly in the cylinder 17, and may contain a valve of other form, but I prefer to provide the plunger with shallow, longitudinal grooves, 19'', and employ a cup packing, 19'''. Upon the up-stroke of the pump, oil will be drawn past the ball, and upon the down-stroke the oil will flow past the cup packing and through the longitudinal grooves 19'' into the cavity, or chamber, wherein the pump cylinder is located. It should be noted that this pump is made as small as possible, my purpose in this regard being to limit the capacity of the chamber, with a view to reducing the size of the device as a whole, and avoiding the presence of a large body of oil which might find its escape through the opening in the disk, should the same happen to stop before one of the outlets, 13. I, however, provide means to prevent such action, as hereinafter described, but, nevertheless, seek to reduce the cavity to minimum size. Within the upper part of the casing member, 1, I provide a chamber, or air dome, 20. (See Figs. 2, 3, and 4). This chamber communicates with the main chamber by means of openings, 20', at its lower ends. It is obvious that the chamber will initially contain air, and that when oil is forced into the main chamber of the casing, it will be driven upward into the dome, thereby compressing the body of air therein, which body operates after the manner of the air in the dome of an ordinary steam pump, saving the device from hammer blows of the pump, and maintaining the pressure during the return stroke of the pump plunger. By employing a simple body of air under compression within the device, I have been enabled to operate the lubricator at very high pressures, notwithstanding the fact that the operation of the distributing device is intermittent. So perfect is this operation that it is difficult to detect the pulsations of the pump when the device is in action. It will be noted that the air dome partially surrounds the cavity which contains the pump yoke, and the inner walls thereof furnish the guides, 19¹, for said yoke.

Referring to Fig. 4, 21 represents a by-pass, which I find to be not only desirable, but practically necessary in lubricators which are operated at high speeds and pressures. This by-pass connects the main chamber, or pressure cavity of the device, with the intake duct, 17'', of the pump. (See passages 21, 21', 21'', and the passage 7''', in the pump plug). 22 is a pin valve for controlling the flow of oil through the by-pass, and 23 is a check valve for closing the by-pass against the return flow of oil, at times when the rotation of the disk is stopped. The check valve comprises the ball, 23, the ball carrier, 23', and the spring 23''. An opening in the carrier 23' permits it to move with respect to the pin valve 22, and when relieved from pressure from above, the spring will force the ball upward, closing the lower end of the duct 21. This check valve is only used when oil is supplied to the pump with slight pressure, that being the only condition under which it would be possible to suffer loss of oil from leakage through the lubricator, and this could only occur if the opening in the disk happened to stop opposite an outlet opening, 13. The duct 21 is made of sufficient size to carry away the entire supply of oil from the pump, if need be, and the quantity which shall be permitted to pass back therethrough is determined by means of the valve 22. For convenience, I have termed the passage 21 as the bleeder, or bleeder passage, and the part 22 is called the bleeder valve. At the opposite side of the pump from the bleeder, I provide a like passage, 24, made tortuous at its lower end, and opening through the bottom of the member 1. This passage does not communicate with the pump as herein shown, but it will be obvious that it may be connected therewith to save the small quantity of oil which passes therethrough, as hereinafter explained. The passage 24 is normally closed by a valve 25, which is held in place by the spring-pressed stem, 26. The spring cavity is closed by a plug, 26', and a screw, 26'', therein, is normally seated against the stem, to positively hold the ball upon its seat. When the screw is turned back, the stem is relieved, and at such times the ball is held only by the spring 26'''. This device I term the adjusting valve, and it is only used during the time that the pin valves 15 are being adjusted. At such times the bleeder valve is closed and the adjusting valve is opened, the latter, because of its spring, opposing a fixed definite resistance to the escape of oil from the casing, or body, thereby maintaining constant pressure within the same, it being assumed that the pump is in operation. The pin valves 15 and 22 have long heads, which enter cavities provided therefor. These cavities are filled with packing, and no other stuffing boxes are required. (See Figs. 4, 5, and 6).

The action of the lubricator here described, is as follows:—It is assumed that several, or all, of the nipples are connected with small oil pipes which lead to the various parts of the bearings of the machine or engine. Also, the dome is connected with a reservoir of oil, the lower end of the pump, as shown, being threaded to receive the oil supply pipe. Suitable means being provided for driving the shaft, it is set in rotation. The rotation of the shaft reciprocates the pump plunger, and rotates the disk distributer upon the annular seat on the member 2, carrying its opening rapidly from one oil discharge opening, 13, to the next in series. The person desiring to adjust the flow of oil from the outlets 13, first closes all of the pin valves 15. After this is done, the screw 26'' is turned back to free the adjusting valve, and then the bleeder valve is closed. The pump soon fills the cavity within the body, or casing, and when the pressure therein becomes sufficient to overcome the spring 26''', the valve 25 will be forced away from its seat, and the oil will drop or flow from the bottom of the lubricator. Observing this, the person knows that sufficient pressure has accumulated in the lubricator, and thereupon begins the adjustment of the pin valves, 15, and adjusts them one after the other according to the requirements of the bearings, or machine parts, which they represent. These adjustments having been completed, the bleeder valve is opened, whereupon the pressure within the device will be reduced. The adjusting valve is then closed by driving the screw against the stem 26, to lock the ball on its seat and close the passage 24. After these adjustments are made, the bleeder valve is quickly adjusted to give exactly the right quantity of oil at the outlets, and as said outlets were adjusted at constant pressure, it will be obvious that the orifices will have fixed relations as to size. This relation will not be changed thereafter, except by re- adjustment of the pin valve 15, and the ratio, or proportional feeding, of oil will be maintained, notwithstanding fluctuations of pressure within the casing. The office of the bleeder is like unto that of the air dome in one respect, namely, it prevents the attainment of dangerous pressure, and aids in equalizing the pressure in opposition to the pressure of the pump, but the chief office of the bleeder is to provide a return flow of oil which shall be proportional to the speed of the pump and the consequent pressure within the cavity. It will be obvious that as the pump supplies oil in excess of the capacity of the outlets, the pressure within the device necessarily rises when the speed of the pump is increased. Such increase compensates for the quicker cut-off, or closure, of the outlet openings, and thereby maintains the flow, or quantity, of oil delivered to the outlets during each revolution of the disk. The bleeder, or by-pass, permits this fluctuation of pressure, as nothing else except a very large air dome would do. If the pressure within the cavity was kept constant, as by leaving the regulating valve free, an increase in the speed of the disk would necessarily lessen the feed of oil to the machine parts; whereas, the bleeder, by providing a passage of fixed size, allows the necessary escape of oil, but is directly responsive to the speed of the pump, it being obvious that the discharge of oil through the bleeder will be proportional to the pressure attained. In this regard the bleeder may be said to serve the purpose of an automatic valve, responsive to different pressures, which might be substituted in the place of the simple bleeder here shown, and which is less desirable, and, hence, not shown. I desire that it shall be understood that in practice, the shaft of my device is preferably driven from some rotating part of the machine or engine to be lubricated, and my lubricator possesses distinctive advantages in such uses, for the reason that the action of the lubricator is at all times directly responsive to variations of speed in the machine or engine. I also desire that it shall be understood that the distributer described herein is employed as the most convenient means for securing minute distribution of the oil to a large number of outlet openings. The distributer may be dispensed with without changing the operation or lessening the utility of the remaining parts of the device, but in cases where I dispense with the distributer, or disk, it is necessary to minutely adjust the pin valves 15, and I prefer to employ the disk simply because it permits less minute adjustment of the pin valves, it being obvious that the outlets may be more widely opened when the discharge of oil thereinto is intermittent. The foregoing will make it obvious that the bleeder is not wholly an accessory to the disk or distributer. It has the same utility when the lubricator is made without the disk, but is perhaps more important in lubricators which are provided with disks or other intermittent distributing means.

The lubricator herein shown is particularly designed for use upon automobile engines, the speed of which is variable, and it will now be understood that the device meets every requirement of such engines. The pressure under which oil is fed to the engine may be varied from one to a thousand pounds by merely adjusting the bleeder valve. As the most convenient means of attaching the lubricator to an engine or machine frame, I employ simple stud bolts, 27, which may be placed in either the vertical or transverse holes, 27' and 27", in the base of the lubricator. The lubricator is always used in the vertical position, i. e., with its air dome uppermost.

A modified form of my lubricator is shown in Figs. 10 to 18 inclusive. The chief differences between this lubricator and that previously described, resides in the different arrangement of the driving shaft and the distributing disk, in the air dome, which is of a different form, and in the arrangement of the several valves and passages in the top of the device, instead of at the bottom thereof. The lubricator here shown is intended to operate at a constant speed, and this being the case, is equipped to maintain a constant pressure; in other words, it is not provided with a bleeder or a bleeder valve, the latter being unnecessary in constant speed lubricators. It will be obvious, however, that this device may be adapted for varying speeds and pressures, by the mere addition of the bleeder and valve, in substantially the manner above described. The members, 28 and 29, of the casing are joined as before, the part 28 containing the pump cavity, 28', and the disk cavity, 28". The member, 29, is provided with a circular seat, 29', on which the distributing disk 30 rotates. Said disk is held by a short central shaft, 30', and is pressed against its seat by a light spring. (See Fig. 12). 30" is an opening to insure equalizations of pressures on opposite sides of the disk. 30'" represents the discharge opening in the disk, to register with the outlet openings in the circular seat, shown only in Fig. 15, and indicated by the positions of the outlet tubes 31. 31' represents the feed adjusting screws, or pin valves, in the member 29. The pump and disk driving shaft, 32, is arranged in the lower part of the casing, and its end is formed as a pinion, 32', which meshes with gear teeth provided on the periphery of the disk 30. An eccentric 33' is also formed on the shaft, and engages the yoke, 34, of the pump plunger, 35. A shoulder, 33'", on the shaft, presses against packing, 28'", placed about the shaft, effectually closing the joint. It will be understood that the shaft is placed within the member 28, before the member 29 is fastened thereon. The pump cylinder, 36, is formed in the member 28, and communicates with the inlet cavity, 37, and with the interior of the casing by valved ducts or passages, 37' and 37". The pump 35, on its down stroke, draws the oil into its cylinder from the oil supply 40 through the inlet duct 37 and the valve duct 37' and on its up stroke it forces the oil into the interior of the casing through the valved duct 36". 38, represents a constant pressure or relief valve, placed in the bottom of the inlet cavity, and communicating with the cavity or chamber within the casing through the passage 38ᵃ. This valve is adjustable by means of the threaded plug, or follower, 38'. The air dome, 39, is also formed in the member 28. It is made by drilling into said member as shown in Fig. 11, and afterward tightly plugging up the end of the hole. (See 39'). 40, represents the oil supply pipe which is connected to the cavity 37.

In Figs. 16 and 17, I have shown one manner of connecting the lubricator with the engine of an automobile. As there shown, the driving wheel of the lubricator, A, is connected to the cam shaft, B, of the engine, by a belt and pulleys, C. D, represent the pipes leading from the lubricator to a sight feed device E on the dash-board of the automobile, and, F, represent the pipes extending therefrom to various parts of the engine. I prefer that the oil supply reservoir, G, should be tight. G', represents the pipe leading to the lubricator, and G", is a pipe leading from the crank case of the engine to the reservoir. The surplus oil of the crank case passes through the strainer, H, the slight compression within the crank case aiding the return flow of the oil to the reservoir, G. A check valve, H', is provided in the strainer, to prevent the emptying of the reservoir when the engine is shut down.

The operation of the lubricator shown in Figs. 10 to 15 is like unto the operation of the lubricator first described, with the exception that as the relief valve is always free, and ready to respond to a pressure exceeding the strength of its spring, a constant pressure will be maintained within the lubricator during the operation of the pump. Adjustment of the pin valves 31' may be made without reference to any other auxiliary in the nature of a bleeder. The pump of this device operates at several times the speed of the disk, inasmuch as the gear disk is of several times the diameter of the driving pinion 32'. I have said that this particular device is intended to fulfil constant pressure conditions. It has, nevertheless, been employed under varying speed conditions, and has performed its work satisfactorily when the variation of speed was not extreme, it being obvious that comparatively slight variation but little effects the outflow of oil through the opening in the disk. Nevertheless, I much prefer to equip my lubricators with bleeder passages and valves when applying the same to the automobile engines and the like, in which the speed varies from few revolutions to over a thousand revolutions per minute.

As various modifications of my invention will readily suggest themselves to one skilled in the art, I do not confine my invention to the specific construction herein shown and described.

Having thus described my invention, I claim as new, and desire to secure by Letters Patent,

1. An improved force feed lubricator, comprising a chambered casing, provided with a plurality of outlets, in combination with means for regulating the flow of oil through said outlets, a pump for forcing oil into said casing, a bleeder, or by-pass, extending from said casing to the intake side of said pump, a spring pressed valve normally blocking the said bleeder and other means for regulating the capacity of said bleeder, substantially as described.

2. An improved force feed lubricator, comprising a chambered casing, provided with a plurality of suitably valved outlets, in combination with a pump for forcing oil into said casing, an air dome within said casing and arranged between said pump and said outlets, and a bleeder, or by-pass, leading from the interior of said casing, substantially as described.

3. A motor adapted to be run at various speeds and having a plurality of bearings, in combination with a mechanically operated oiling device, means connecting the device with the motor for operation thereby at proportional speeds, said oiling device comprising a chambered casing provided with a plurality of suitable valve outlets, delivery pipes connecting the several outlets with respective bearings, a pump for forcing oil into the casing, a bleeder leading from said casing, and a controlling valve for said bleeder, substantially as described.

4. An improved force feed lubricator, comprising a chambered body, or casing, provided with a plurality of suitably valved outlets, a pump for forcing oil into said casing in combination with a distributer within said casing arranged between said pump and said outlets, for controlling the discharge of oil therefrom, means for actuating said distributer, the pump being also actuated by said means, and an air dome interposed between the pump and said outlets, substantially as described.

5. An improved force feed lubricator, comprising a chambered body, or casing, which is provided with a plurality of suitably valved outlets, in combination with a pump for forcing oil into said casing, a bleeder connecting said casing with the intake side of said pump, and a constant pressure valve, as and for the purpose specified.

6. An improved force feed lubricator, comprising a chambered body, or casing, in combination with a plurality of suitably valved outlets leading therefrom, an air dome, a pump for forcing oil into said casing, a bleeder valve connecting the casing with the intake side of said pump, and a constant pressure valve, substantially as described.

7. An improved force feed lubricator, comprising a chambered body, or casing, in combination with a plurality of suitably valved outlets leading therefrom, an air dome, a pump for forcing oil into said casing, a bleeder valve connecting the casing with the intake side of said pump, and a constant pressure valve, and means for locking said constant pressure valve shut, substantially as described.

8. An improved force feed lubricator, comprising a chambered body, or casing, provided with a plurality of valved outlets, in combination with a rotary distributer arranged in said casing, means for driving said distributer and pump, and an auxiliary chamber within said casing serving as an air dome and communicating at its lower end only with the interior of said casing through a restricted passage, substantially as described.

9. An improved force feed lubricator, comprising a chambered body or casing, which is provided with a plurality of valved outlets, in combination with a pump for forcing oil into said casing, a distributer within said casing arranged between said pump and said outlets, a shaft connected with said distributer and the plunger of said pump for driving same, and an air dome within said casing, substantially as described.

10. An improved force feed lubricator, comprising a chambered body, or casing, in combination with a plurality of valved outlets leading from said casing, a distributer within the casing, an air dome, an oil pump connected to the casing, means within the casing for driving said distributer and pump, a valved bleeder, and a constant pressure adjusting valve, substantially as described.

11. An improved force feed lubricator, comprising a chambered body, or casing, containing a main chamber and an air dome, in combination with a plurality of outlets leading from said casing, a pump for forcing oil into said casing, a valved bleeder connecting the casing with the intake end of said pump, and a constant pressure adjusting valve, substantially as described.

12. An improved force feed lubricator, comprising a body or casing, having an air dome in its upper part, a rotary distributing disk provided within said casing, a plurality of valved outlets connected with the casing, to receive oil from said distributer, a pump cylinder detachably secured in said casing, a pump plunger, and means within the casing for driving said plunger and said disk, substantially as described.

13. An improved force feed lubricator, comprising a chambered body, provided with a plurality of valved outlets, in combination with a pump for forcing oil into said casing, a bleeder connecting the casing with the intake end of the pump, an adjusting valve in said bleeder, and a back check valve in said bleeder, substantially as described.

14. An improved force feed lubricator, comprising a chambered body, or casing, provided with a plurality of valved outlets, in combination with a pump cylinder detachably arranged within said casing, a pump plunger within the casing, a distributer within the casing arranged between the pump and the outlets, means within the casing for driving said distributer and said plunger, an air dome with its lower end connected with the interior of said casing, and a constant pressure valve for relieving excessive pressure of oil within the casing, substantially as described.

15. An improved force feed lubricator, comprising a chambered body or casing provided with a plurality of valved outlets, a single pump for forcing oil into said casing and constantly maintaining pressure therein in proportion to its speed of operation a single distributer in said casing arranged between said pump and said outlets, and a separate compartment in said casing serving as a pressure regulator, substantially as described.

16. An improved force feed lubricator, comprising a chambered body, provided with a plurality of valved outlets, in combination with a single pump for forcing oil into said casing, and a by-pass leading from the casing to the receiving end of said pump, and suitable cushioning means tending to maintain constant pressure within said casing, substantially as described.

17. An improved feed lubricator, comprising a chambered casing, having a plurality of outlets, a separate valve within the casing for each of said outlets, an air dome within the casing communicating at its lower end only with the chamber through a restricted opening, a pump within the casing for forcing oil into said air dome, constant pressure means connected with said dome, and a single distributer arranged between the dome and the outlets whereby measured quantities of oil escape from the chamber through said outlets, substantially as described.

18. An improved force feed lubricator, comprising a chambered body or casing, a plurality of outlets in said casing, a valve for each outlet housed in said casing, an air dome within said casing, a pump contained within said casing for pumping oil into said air dome, means for maintaining a constant pressure in said air dome and means for distributing oil to the said outlet passages, substantially as described.

19. In a force feed lubricator, a casing containing a closed oil chamber, oil admission and outlet conduits entering the lower part thereof, and air dome communicating with the lower part thereof, means for forcing oil into the chamber and thereby placing the air in the dome under pressure, a plurality of adjustable delivery openings connected with said outlet, and a distributer controlling the flow of oil through said delivery openings.

20. In a force feed lubricator, a casing containing an inverted V-shaped air chamber, a closed oil chamber communicating with the lower end thereof, an inlet and an outlet passage for said oil chamber, means for forcing oil into said oil chamber and placing the contained air in the air chamber under pressure, and a plurality of controlled openings communicating with said outlet.

21. In a force feed lubricator, a casing containing an air-dome having two downward extensions, a closed oil chamber arranged between the extensions of said air-dome and having its lower part connected with the lower part of the air-dome, means within the casing located between said extensions of the air-dome for forcing oil into said chamber through the inlet and whereby the contained air is placed under pressure, and a plurality of valved delivery openings communicating with said outlet.

22. In a force feed lubricator, a casing containing an air chamber having two spaced downward extensions, a closed oil chamber communicating at its lower end with said air chamber, an oil inlet and an outlet for said oil chamber, means between said extensions for forcing oil into said oil chamber through said oil inlet, whereby the trapped air is placed under pressure, a plurality of valved oil delivery openings communicating with said outlet, and means within said casing and adjacent to said openings controlling said outlets.

23. In a force feed lubricator, a casing containing a relatively large air chamber having two spaced downward extensions, an oil reservoir within said casing beneath said chamber an oil passage connecting said oil reservoir with the lower part of said air chamber, an oil inlet and an oil outlet for said oil reservoir, means within said casing arranged between said extensions for forcing oil into said chamber through said inlet and thereby placing the trapped air in the air chamber under pressure, an outlet passage communicating with one of the extensions of the air chamber, a spring controlled bleeder valve connecting said outlet passage with the inlet passage of the oil reservoir, a plurality of oil delivery openings communicating with the outlet of said oil reservoir, and a perforated distributer within said casing controlling the flow of oil through said delivery openings.

In testimony whereof, I have hereunto set my hand, this 5th day of December, 1906, in the presence of two subscribing witnesses.

CHARLES GILBERT HAWLEY.

Witnesses:
 GEORGE J. READ,
 M. SIMON.